United States Patent Office 3,576,890
Patented Apr. 27, 1971

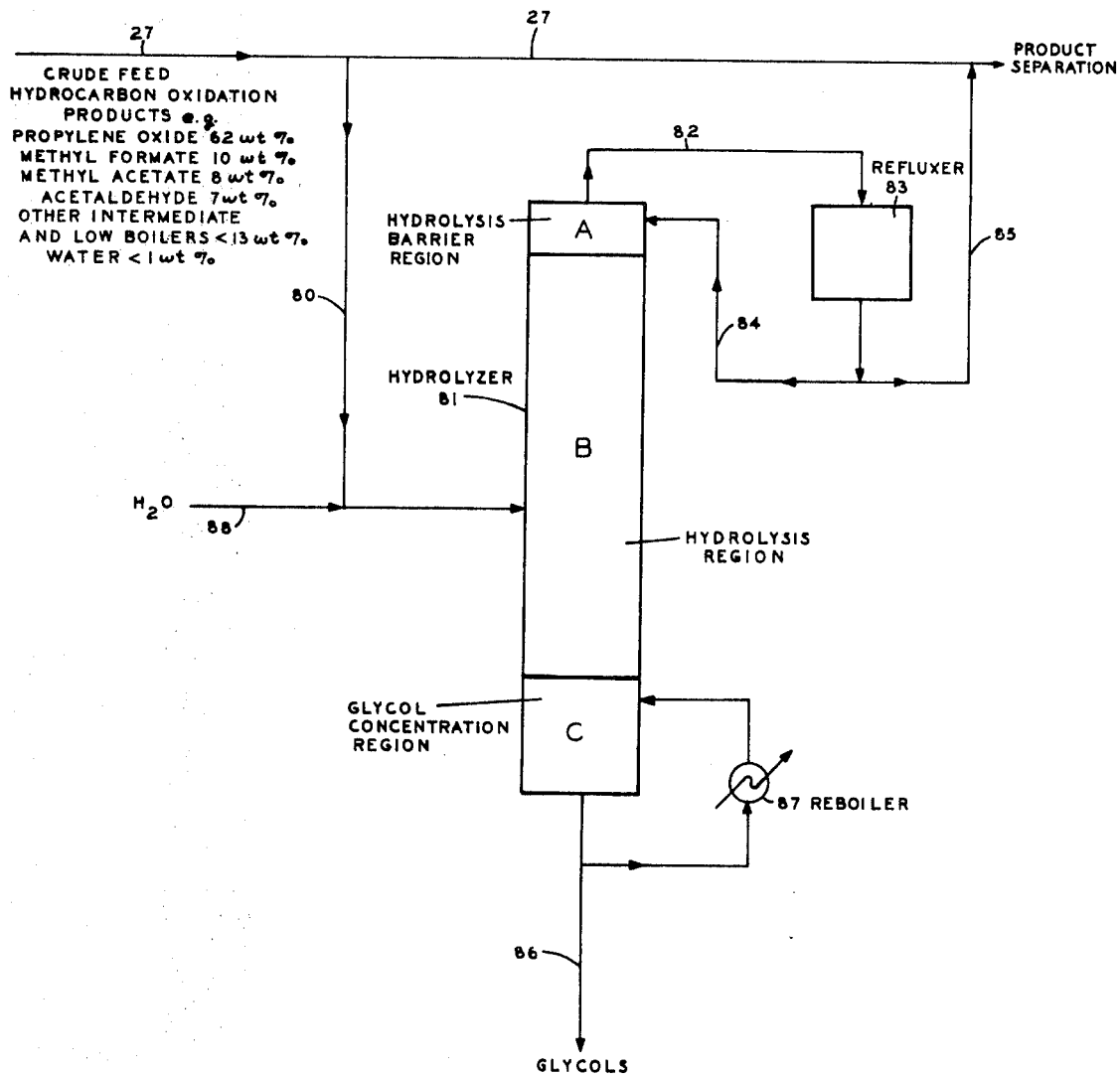

3,576,890
PROCESS FOR THE PREPARATION OF ALKYLENE GLYCOLS
Robert C. Binning, St. Louis, Mo., assignor to Monsanto Company
Continuation of application Ser. No. 667,009, Sept. 11, 1967, which is a continuation of application Ser. No. 344,173, Feb. 12, 1964, both now abandoned. This application Dec. 23, 1968, Ser. No. 788,683
Int. Cl. C07d 1/08; C07c 31/20
U.S. Cl. 260—635                  3 Claims

ABSTRACT OF THE DISCLOSURE

Crude alkylene oxides obtained by oxidation of hydrocarbons and containing ester material and material boiling intermediate alkylene oxide and water is introduced into a hydrolyzer having: an upper hydrolysis barrier region comprising intermediate boiling material; a middle hydrolyzing region where part of the alkylene oxide is hydrolyzed to alkylene glycol; and a lower glycol concentration region. The glycol is recovered substantially water free and the alkylene oxide that is not hydrolyzed is recovered.

---

This application is a continuation of application S.N. 667,009, filed Sept. 11, 1967 and now abandoned, which in turn is a continuation of application S.N. 344,173, filed Feb 12, 1964 and now abandoned.

This invention relates to a process for the preparation of alkylene glycols.

In broad aspect, the present invention relates to the production of alkylene glycols by hydrolysis of the corresponding alkylene oxide, particularly those having from two to four carbon atoms. Of particular interest herein is the hydrolysis of propylene oxide to propylene glycol.

Another aspect of the present invention relates to a unique method of hydrolyzing alkylene oxides to produce glycols and to overcome limitations heretofore imposed on alkylene oxide hydrolysis processes.

Still another aspect of this invention relates to the recovery of alkylene oxides from product streams containing them, particularly such as are produced by the direct oxidation of olefins with molecular oxygen, and hydrolysis of these alkylene oxides to the corresponding glycol.

In the prior art are found many processes for the preparation of alkylene glycols. For example, some processes involve the bimolecular reduction of ketones, or reduction of esters of dibasic acids, or cleavage of cyclic ethers, or hydrogenation of hydroxy-substituted carboxylic acids. Still other methods involve the direct hydroxylation of olefinically unsaturated compounds with peroxidic compounds to produce glycols. Another method involves the reaction of an alkadiene with diborane in an aliphatic ether to form an organoborine-type compound which is subsequently oxidized and hydrolyzed to produce diols.

The more common and commercially attractive method for producing glycols, however, involves the hydrolysis of alkylene oxides. In general, there are two types of hydrolysis procedures viz, high temperature-high pressure hydrolysis and acid-catalyzed hydrolysis. Combinations of these two methods are also found in the art.

The use of high temperatures and pressures to produce glycols is disadvantageous from the standpoint of requiring expensive high pressure equipment. In addition, higher temperatures and pressures are conducive to the production of polyglycols. For these reasons, many prior workers have resorted to means less expensive for producing glycols. A logical alternative was the use of acid-catalyzed hydrolysis of alkylene oxides.

There are numerous prior art patents claiming acid-catalyzed alkylene oxide hydrolysis processes. Earlier workers in this field recognized that the hydrolysis could be performed with either acid, alkylene or neutral catalysts; that as catalysts could be used those substances which in water solution liberate hydrogen ions which are probably the real catalysts. (U.S. Pats. 1,641,710 and 2,135,271). Use was therefore, made to substances having high constants of dissociation to provide hydrogen ions. Among the first and more common substances used were mineral acids, e.g., sulfuric acid, hydrochloric acid, nitric acid, perchloric acid and phosphoric acid. (See, e.g., U.S. Pats. 1,641,710, 1,875,312, 2,135,271 and 2,255,411.)

It has been pointed out in the art that the use of mineral acids as hydrolysis catalysts in disadvantageous chiefly because they yield glycol solutions containing impurities. These acids have to be neutralized in the glycol solution to prevent chemical attack on the glycols. Neutralization was generally accomplished by use of alkali metal hydroxides or other basic substance to precipitate metal salts, which were filtered and the glycol solution then evaporated and/or distilled to concentrate the glycol. However, the filtration operation was not only not always complete especially in the case of calcium sulfate, but could not, even if complete, prevent the passage of some soluble organic sulfur compounds through the filter with the glycol solution and these compounds upon distillation would char, thus soiling the apparatus, impede their operation and lower their output.

In order to avoid the problems posed by use of mineral acid catalysts, one prior art method (U.S. Pat. 2,108,936) utilized oxalic acid to catalyze hydrolysis of alkylene oxides to alkylene glycols, on the basis of the fact that the calcium salt of oxalic acid is completely insoluble and, too, upon neutralization of the oxalic acid with milk of lime no soluble complexes were formed which would escape filtration.

Here again, the hydrolysis procedure had not avoided the problem of a long and difficult separation of insoluble salts from the product glycol, or the problem of scaling in the evaporating apparatus.

A further attempt was then made to solve this problem by use of a trihalogenacetic acid (U.S. Pat. 2,472,417). The advantage of using such acid, typified by trichloroacetic acid, is that it is stable at temperatures of hydration of ethylene oxide to ethylene glycol (e.g., 50° C.), but at the higher temperature of evaporation it completely decomposes into volatile products which are themselves useful, e.g., chloroform and $CO_2$, and these are eliminated from the glycol without difficulty. But, having apparently solved one difficulty, the latter process met another difficulty, viz, in evaporating the product glycol hydrochloric acid is produced and which must be removed. Removal of this acid was therefore accomplished by neutralization with lime followed by distillation of the ethylene glycol leaving a residue of polyglycols and calcium chloride.

Subsequently, another approach was taken (U.S. Pat. 2,623,909) wherein propylene oxide is hydrolyzed to propylene glycol in an aqueous hydrolysis medium containing from a trace to 0.1% by weight of methyl formate or sufficient carbon dioxide to maintain a critical pH of below 6.5. Since the reaction medium containing the glycol product is maintained at pHs anywhere below pH 6, it is apparent that some means of neutralizing the glycol is required. Moreover, this process has the express limitations that it must be operated at critical water-to-propylene oxide ratios and, as exemplified, operates at temperatures no less than 125° C. and autogenous pressures on the order of 125 to 200 pounds per square inch under the temperature conditions employed, and this even in the presence of a hydration catalyst. In addition, this process requires the use of stainless steel equipment when operating at pHs below 6 in order to eliminate the corrosion problem.

Among other disadvantages disclosed in prior art processes and, therefore, limitations thereon, are the need to use molecular equivalents of water to obtain anhydrous glycols. This approach was countered by the use of large excesses of water in the hydrolysis reaction, but this resulted in very dilute solutions of glycols which, in turn, require the use of evaporators and/or distillation columns to remove large quantities of water and concentrate the glycol.

Still other alkylene oxide hydrolysis processes disclose the requirement of having to recycle water solutions of product glycol through the hydrolyzer and/or absorbers to concentrate the glycol solution, or water solutions of alkylene oxide to assure completion of the reaction. A variation is to introduce the alkylene oxide feed stream and water of hydrolysis into the hydrolyzer in countercurrent directions to facilitate hydrolysis.

It is, therefore, a primary object of this invention to provide a process for the acid-catalyzed hydrolysis of alkylene oxides to alkylene glycols which is free of numerous limitations recited in prior art processes.

Accordingly, it is an object of this invention to provide a process which requires the addition of no extraneous hydration catalysts, per se; which involves no use of neutralizers, filters, evaporators or distillation columns outside the hydrolyzer to separate salts and concentrate product glycol; which is not pH dependent, or dependent upon water-to-alkylene oxide ratios and which does not depend upon or utilize countercurrent flow of the alkylene oxide reactant and water of hydrolysis.

It is a further object of the invention to provide a process which produces a glycol product low in polyglycols.

Still another object of this invention is to provide a process for hydrolyzing alkylene oxides directly from streams of these oxides having varying proportions of other compounds present or from mixtures of compounds having varying proportions of alkylene oxide therein.

Yet another object of this invention is to provide a controlled alkylene oxide hydrolysis process wherein unreacted alkylene oxide is not recycled to the hydrolyzer, but is recovered for use elsewhere.

These and other objects will become apparent as the description proceeds.

A schematic diagram of the hydrolysis process is shown in the figure of the accompanying drawing.

According to the present invention it has been discovered that alkylene oxides can be efficiently hydrolyzed to the corresponding alkylene glycols when at least one of the former is introduced into a water-loaded hydrolyzer as one component of a multi-component crude feed and when at least one and preferably more of the other components of the feed stream have boiling points intermediate of that of the alkylene oxide and that of water; and further provided that at least one of these other components is an ester of a lower alkanol and alkanoic acid, said ester having from 1 to 4 carbon atoms in each of the alcohol and acid moieties. Preferably, one of the esters should be a formate, e.g., methyl formate.

It is also necessary in carrying out the present invention that the overhead temperatures in the hydrolyzer be less than the boiling point of water, i.e., 100° C., preferably not more than 90° C., in order to accomplish one of the objects of this invention. The lower limit of the hydrolyzer overhead temperature corresponds, in general, to the hydration temperature of the particular alkylene oxide which is near the boiling point of the oxide. Thus, in the case of ethylene oxide, hydration proceeds fairly rapidly as low as about 12–13° C., or around 35° C. in the case of propylene oxide, about 53–54° C. for butylene oxides, e.g., isobutylene oxide and about 75° C. for butadiene monoxide. Higher temperatures of course expedite the hydration.

Temperatures at the bottom of the hydrolyzer column on the other hand should be no higher than 225° C. In this region of the hydrolyzer product glycol is concentrated and all water stripped therefrom. In general, temperatures in this region will range 15° C.–30° C. above the boiling point of the particular glycol being produced.

Since the temperatures which may be used herein are relatively low (because of the catalyst discussed below) the pressures are correspondingly lower. In general, suitable pressures are within the range of from 200 mm. Hg to 50 p.s.i.g.

It has been found that in the present hydrolysis system when the above prerequisites are fulfilled, that alkylene oxides can be hydrolyzed without the use of added catalysts, without loss of water in the overhead and bottoms product streams and without the production of much polyglycol.

More particularly, when alkylene oxide feed streams containing esters, as above defined, are introduced into the hydrolyzer, these esters (present in much greater quantities than catalytic amounts, i.e., from trace amounts to about 0.5% by weight based on the oxide) are hydrolyzed to an alcohol and an acid which are in equilibrium with the ester and water. The acid functions as a catalyst for the alkylene oxide hydrolysis and since the ester hydrolysis is a reversible reaction, the acid is continuously available to catalyze the hydrolysis of the alkylene oxide to glycol, uncontaminated with acid.

This mode of catalysis avoids the need to introduce extraneous catalysts and also avoids strong concentrations of acids which rapidly react with the oxides and glycols, resulting in aldehydic and polymerization products, while at the same time obviating a need to neutralize product glycol.

As indicated above, the alkylene oxide should be introduced into the hydrolyzer as a feed together with some intermediate boiling components. The purpose of this operation is to provide in the hydrolyzer a buffer or hydrolysis barrier of these intermediate boilers between the hydrolysis water below and ureacted alkylene oxide refluxed to the hydrolyzer above. With this buffer it is possible to prevent any further hydrolysis of unreacted, refluxed alkylene oxide, The value of this operation is that such unreacted alkylene oxide can then be removed from the hydrolysis system and recovered, per se, or can be reacted with other byproducts, such as acetic acid in an integrated oxidation process, for example, to produce stable glycol esters suitable for use as oxidation solvents or as paint and varnish solvents.

It is, of course, possible to produce the above buffer between alkylene oxide and water without necessarily introducing the intermediate boiling components via the alkylene oxide feed stream. In fact, the alkylene oxide can be introduced individually in a separate feedline and the intermediates by yet other means. However, in practice it will be more convenient to introduce all these components into the hydrolyzer by means of a common feedline.

Alkylene oxides that are suitably hydrolyzed herein include those having boiling points below that of water. Included among these are the oxides of ethylene, propylene, butylenes, e.g., isobutylene, butene-1, butene-2, amylenes, e.g., pentene-1, pentene-2, 2-methylbutene-1, -2 and -3, and the like.

Among suitable esters which must be in the alkylene oxide feed stream are included methyl formate, methyl acetate, methyl propionate, methyl butyrate, ethyl formate, ethyl acetate, ethyl propionate, ethyl butyrate, propyl formate, propyl acetate, propyl propionate, propyl butyrate, butyl formate, butyl acetate, butyl propionate and butyl butyrate. Of these, the various formates are preferred.

Although feed streams from any source containing the necessary components described herein may be used, a particularly suitable source of feed materials derives from aliphatic hydrocarbon oxidation processes, e.g., in the direct oxidation of olefinic feedstocks with molecular oxygen to produce olefin oxides. In such oxidations a variety of low, intermediate and higher boiling products is produced. Upon fractionation of these various boiling range products to separate, if desired, individual components, e.g., alkylene oxide, or fractions containing several close boiling compounds, e.g., a fraction containing acetone, methanol and methyl acetate, there is obtained a product stream containing the necessary components for utilization in this invention. One such stream will be described in the example below. Of course, the crude feed need not derive, in toto, from any particular process, but one of the benefits of the instant process is this hydrolysis system can untilize such crude product streams as a source of feed materials. Synthetic feeds meeting the above requirements are also suitable. A further advantage of the present hydrolysis system is that it can be incorporated as an integrated unit into a number of various co-product processes to produce glycols as one of the primary products.

In general, a portion of the feed stream is fed to a hydrolyzer column wherein olefin oxide in the crude feed to this column is hydrolyzed primarily to the corersponding monoglycol and minor quantities of polyglycols which are removed in a water-free condition from the bottom of the column. Where desired the minor amount of polyglycols can be removed in a glycols separation column. The overhead from the hydrolyzer containing the same components fed to this column, less the hydrolyzed olefin oxide, is refluxed to the top of the column while a product take-off stream is fed to the other branch of the feed stream going to a products separation train.

By means of this hydrolysis operation the utility and flexibility of the present process is greatly increased. For example, all or any part of the olefin oxide present in the feed stream can be hydrolyzed to the corresponding glycol. In general, however, the purpose of this process is accomplished when only a portion of the olefin oxide in said feed stream is hydrolyzed to glycol, leaving some unreacted olefin oxide for recovery or other use, e.g., in an integrated hydrocarbon oxidation and product recovery system.

The process described in the following example and having reference to the figure in the accompanying drawing illustrates a preferred embodiment of the present olefin oxide hydrolysis system operating on one of the main product recovery streams resulting from a propylene feedstock oxidation.

EXAMPLE

In this embodiment of the invention, a propylene oxide hydrolysis operation is incorporated into the refining train for the products in a side stream 27 from a primary products splitter (not shown). This stream contains a variety of low and intermediate boiling components including propylene oxide, methyl formate, methyl acetate, acetaldehyde, propanol, methanol, allyl alcohol, isopropanol, acetone, water and others. The chief components of this stream comprise approximately 62% by weight propylene oxide, 10% methyl formate, 8% methyl acetate, 7% acetaldehyde and the balance distributed among the other products mentioned. Water in this stream amounts to less than 1% by weight based on the total stream.

This side stream is directed to an intermediates removal column (not shown) for removal of intermediate boiling components. However, in the present embodiment a portion of this side stream is fed through line 80 to a hydrolyzer column. This column 81 is loaded with water through line 88 at start-up and no additional water is needed to replace water removed from effluent streams since the column is operated in such manner that essentially no free water leaves the column. One advantage of the present operation is that by virtue of the particular components in the crude feed to the hydrolyzer, the hydrolysis is self-catalyzed, thus requiring no added catalysts. More particularly, methyl formate and methyl acetate in the feed are hydrolyzed to methanol and formic and acetic acids, respectively. This is a reversible reaction with the water and ester being in equilibrium with the alcohol and acid. At steady state, therefore, for each mole of ester fed to the column a mole of ester is removed from the column.

In a typical operation a side stream 27 is removed from a primary products splitter at a rate of 523 g./hr. corresponding to the following composition (gram moles/hr.): acetaldehyde, 0.83; methyl formate, 0.89; propylene oxide, 5.57; methanol, 0.93; methyl acetate, 0.55; acetone, 0.52; water 0.24 and other intermediate boiling components, 0.79. This side stream is then split two ways: one-half of which is directed on through line 27 to an intermediates removal column and one-half of which is directed through line 80 to a middle region of the propylene oxide hydrolyzer 81 located between the primary products splitter and intermediates removal column. Thus, the crude feed to the hydrolyzer column is introduced at a rate of 261 g./hr. corresponding to a propylene oxide feed rate of 2.79 gram moles/hr. and feed rates of one-half the above values for the other components. The hydrolyzer contains a plurality of trays and is heated to about 56° C. at the top and 219° C. at the bottom by means of reboiler 87 under pressures of about 15 p.s.i.g. at the top and 20 p.s.i.g. at the bottom of the column and has a reflux ratio of about 100 to 1.

The overhead product is passed through line 82 and refluxed from refluxer 83 through line 84 to the top tray of the column, since in this general region, A, of the column, but above the water level, most of the aforementioned intermediate boiling components, having boiling points between that of water and propylene oxide, form a buffer or cushion between these two compounds. In this manner any propylene oxide which is not hydrolyzed in the first pass through the column is prevented from further hydrolysis and is taken overhead along with intermediates and removed in a product takeoff stream for recovery, thus enhancing the efficiency of the primary oxidation process, upon a product stream of which the present hydrolysis operates.

In this embodiment about 60% of the propylene oxide fed to the hydrolyzer column is hydrolyzed in region B to propylene glycol. Water of hydrolysis is made up as needed, e.g., by introduction into the feed stream through line 88. Unreacted propylene oxide is directed through an overhead product take-off stream at a rate of about 1.1 gram moles/hr. and recombined with the other portion of the primary products splitter side stream 85 going into the intermediates removal column. The recombined propylene oxide feed rate to the intermediates removal column is about 3.9 gram moles/hr.

In the hydrolyzer, as mentioned, about 60% of the propylene oxide fed to the column is hydrolyzed to glycols, primarily propylene glycol, together with lesser quantities of di- and tripropylene glycols. These glycols are stripped of water in region C of the hydrolyzer and are removed as bottoms through line 86 at a rate of about 1.7 gram moles/hr. in a water-free condition. This bottoms stream can be used as is for many purposes, but in this embodiment is fed to a glycols separation column not shown for removal of the small amount of polyglycol. This column operates at about 145° C. at the top and 210° C. at the bottom under 200 mm. pressure and a reflux ratio of 0.4. Propylene glycol is removed overhead at a rate of about 1.5 gram moles/hr., while tripropylene glycol is removed as bottoms. Dipropylene glycol is recovered by means of a side stripper column operating at about 190° C. at the top and 200° C. at the bottom under 200 mm. pressure and a reflux ratio of 0.4. Feed to the side stripper column is from an upper middle side stream from the glycols separation column with a recycle stream below this near the middle of the column.

For most purposes the total glycol stream from the hydrolyzer column can be used without the necessity for separating individual glycols.

Primary advantages of the hydrolysis system exemplified here are that: (1) the feed stream to the hydrolyzer can contain a large fraction of impurities, i.e., other compounds formed in the propylene oxidation process besides the propylene oxide without interfering with the hydrolysis; (2) these other compounds, including some low boilers and some intermediate boilers, fed to the hydrolyzer with the propylene oxide serve two very useful functions in the hydrolyzer, viz, (a) they catalyze the hydrolysis, thus obviating the need of extraneous catalysts together with requisite neutralization procedures and (b) the intermediate boilers form a buffer zone between water in the hydrolyzer and propylene oxide refluxed to the top of the hydrolyzer, thus preventing refluxing to a hydrolysis zone and permitting some propylene oxide to pass overhead and be recovered and/or used as such; (3) because of the self-catalyzed nature of the hydrolysis lower temperatures and pressures can be used in the hydrolysis zone of the hydrolyzer; (4) because of the lower overhead temperatures and pressures and higher temperatures at the bottom to strip water from glycols in the hydrolyzer, all the water remains in the hydrolyzer, thus avoiding and thereby eliminating, additional columns to separate water from overhead and bottom streams, and recycle water equipment; the only additional water required is make-up water for water of hydrolysis; and (5) propylene glycols are obtained directly from the hydrolyzer in a water-free condition and can be used directly as such.

The hydrolysis process described herein may be operated to feed more or less olefin oxide to the hydrolyzer and by increasing or decreasing the temperature and pressure increase or decrease the conversion of oxide to glycol, as desired.

Various other modifications and variations of the present invention will occur to those skilled in the art without departing from the spirit and scope thereof.

What is claimed is:

1. Process for the preparation of alkylene glycols which comprises contacting water and a crude feed mixture derived from lower aliphatic hydrocarbon oxidation processes and containing lower alkylene oxide and other oxygenated components having a boiling point intermediate that of said alkylene oxide and water, at least one of said oxygenated components being an ester of a lower alkanol and a lower alkanoic acid and is present in greater than catalytic amounts, in a hydrolysis system having:

(a) an upper hydrolysis barrier region
   (b) a middle hydrolysis region and
   (c) a lower glycol concentration region, said hydrolysis system being maintained at temperatures within the range of 12° C. to 100° C. at the top and no higher than 225° C. at the bottom under pressures within the range of from 200 mm. Hg to 50 p.s.i.g., said temperatures and pressures being adjusted within said system to maintain in (a) a hydrolysis barrier of said oxygenated components between alkylene oxide refluxed to (a) and water of hydration in (b), and (c) is maintained at a temperature no higher than 225° C. and high enough to strip all water from the glycols concentrated therein, and recovering anhydrous alkylene glycols as bottoms from said system.

2. Process according to claim 1 wherein unreacted alkylene oxide is taken overhead essentially free of water and refluxed to a region of said hydrolysis system separated from hydrolysis water by said hydrolysis barrier.

3. Process according to claim 1 wherein said alkylene oxide is propylene oxide and said ester is methyl formate.

References Cited

UNITED STATES PATENTS

| | | | |
|---|---|---|---|
| 2,236,919 | 4/1941 | Reynhart | 260—635E |
| 2,623,909 | 12/1952 | Robeson et al. | 260—635E |
| 2,784,202 | 3/1957 | Gardner et al. | 260—635H |
| 2,839,588 | 6/1958 | Parker | 260—635E |
| 3,071,601 | 1/1963 | Aries | 260—635H |

FOREIGN PATENTS

| | | | |
|---|---|---|---|
| 39/16455 | 1963 | Japan | 260—635E |

BERNARD HELFIN, Primary Examiner

J. E. EVANS, Assistant Examiner

U.S. Cl. X.R.

23—150; 252—364; 260—348.5, 488, 615, 664